Figure 1:
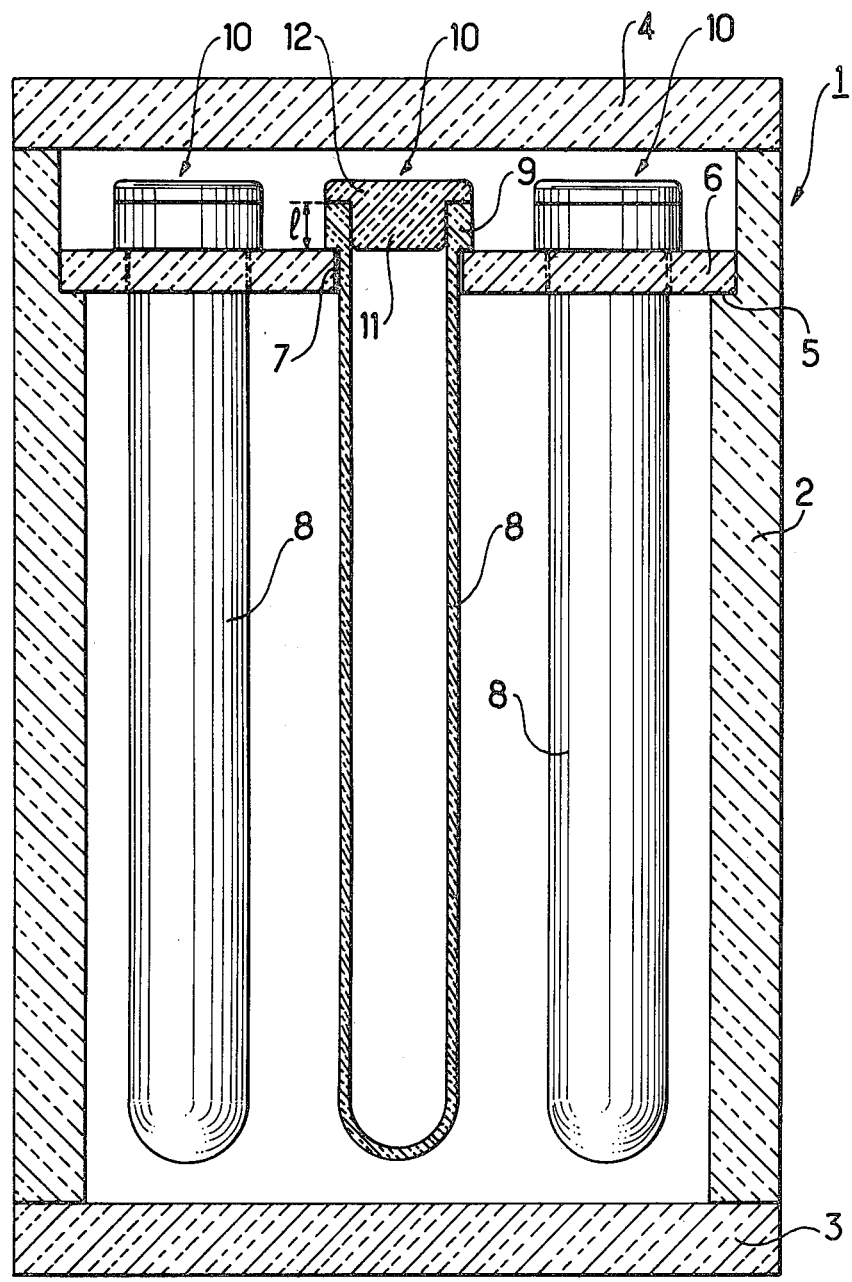

United States Patent [19]

Desplanches et al.

[11] 4,330,496
[45] May 18, 1982

[54] METHOD OF SINTERING TUBULAR CERAMIC PARTS

[75] Inventors: Gerard Desplanches, Palaiseau; Gerard LeClerc, Thiais, both of France

[73] Assignee: Compagnie Generale d'Electricite, Paris, France

[21] Appl. No.: 173,170

[22] Filed: Jul. 28, 1980

[30] Foreign Application Priority Data

Sep. 11, 1979 [FR] France .................. 79 22645

[51] Int. Cl.$^3$ .............................. F27B 9/14
[52] U.S. Cl. ........................... 264/57; 264/58; 428/36; 501/1; 501/127
[58] Field of Search ............ 264/57, 58; 423/625; 428/36; 501/1, 127

[56] References Cited

U.S. PATENT DOCUMENTS

| | | | |
|---|---|---|---|
| 2,914,834 | 1/1959 | Daniel | 264/57 |
| 2,948,949 | 8/1960 | Schüffler | 264/58 |
| 4,068,048 | 1/1978 | Desplanches et al. | 264/58 |
| 4,263,381 | 4/1981 | McEntire et al. | 264/57 |

FOREIGN PATENT DOCUMENTS

| | | |
|---|---|---|
| 2317067 | 2/1977 | France . |
| 2341533 | 9/1977 | France . |
| 2397376 | 2/1979 | France . |

Primary Examiner—Donald E. Czaja
Assistant Examiner—W. Thompson
Attorney, Agent, or Firm—Kenyon & Kenyon

[57] ABSTRACT

A tubular ceramic part is formed with a shoulder at an open end of the part, the tubular part is inserted in an opening provided in a horizontal plate which is disposed inside a sintering chamber so that the part is kept suspended in the chamber by means of the shoulder which rests against the edge of the opening, a shouldered cylindrical plug is inserted into the open end of the tubular part until the shoulder of the plug bears against the end of the tubular part, and the chamber is brought to sintering temperature. The invention is implemented to produce solid beta sodium alumina electrolyte tubes for sodium-sulphur electric cells.

8 Claims, 2 Drawing Figures

METHOD OF SINTERING TUBULAR CERAMIC PARTS

The present invention relates to a method of sintering tubular ceramic parts. It is known that during sintering, ceramic parts undergo contraction both in linear dimension and in volume, the extent of said contraction depending on the composition of the part and on the sintering temperature. Such contraction often greatly deforms said parts.

This is particularly the case with tubular parts made of alkaline beta alumina which are suitable for use as solid electrolytes in sodium-sulphur electric cells.

In the usual process, after forming, these tubes are disposed on the bottom of a sintering chamber which is itself placed in an oven which is suitable for bringing the parts to sintering temperature.

It is observed that parts sintered in this way are sometimes very greatly deformed, and it is necessary in all cases to machine them to the required dimensions and therefore to remove a large amount of substance. Such a machining operation is a long and expensive operation since it entails high consumption of diamond tools such as grinding wheels, lapping tools, bores and the like, which are expensive.

The method of the present invention mitigates these drawbacks, making it possible to sinter tubular ceramic parts substantially without change in shape. Said method is easy to implement and can be very reliable.

The invention provides a method of sintering a tubular ceramic part, in which method the part is disposed in a chamber which is suitable to be brought to sintering temperature, wherein the method includes the following successive operations:

during forming, an extra thickness is imparted to one end of the outer wall of the part;

the tubular part is inserted in an opening provided in a horizontal plate which is disposed inside the chamber so that the part is kept suspended in the chamber by means of said extra thickness which rests against the edge of said opening;

a solid part which includes a body and a shoulder that bears against the edges of said end is inserted in the tubular part; and said chamber is brought to said sintering temperature.

Figure 2:
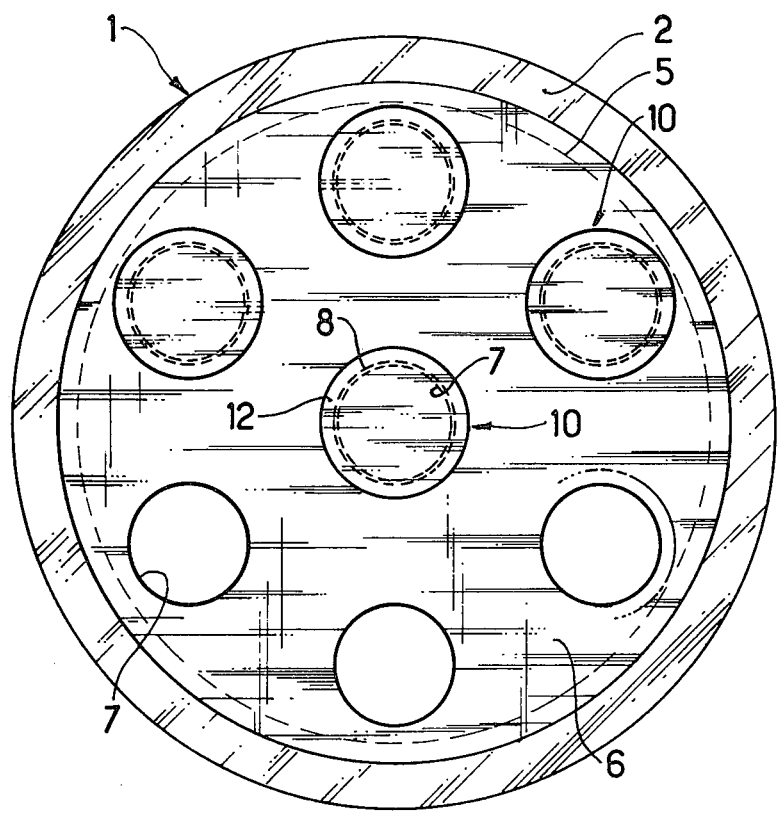

Other details of the invention become apparent from the following description given purely by way of example with reference to the accompanying drawings in which:

FIG. 1 illustrates implementation of the method in accordance with the invention; and FIG. 2 is a plan of FIG. 1, the cover of the sintering assembly presumably being removed.

The figures show a sintering chamber referenced 1 as a whole. Said chamber includes a cylindrical body 2 which rests on a base 3 and is closed at the top by a cover 4. A shoulder 5 is provided on the inner wall of said body 2. A plate 6 made for example of beta sodium alumina is placed on said shoulder 5. Said plate 6 has a plurality of circular openings 7 each of which has a diameter slightly larger than the outside of the part 8 to be sintered, in this case a tube made for example of beta sodium alumina and closed at the bottom. Said tube is advantageously formed by electrophoresis or by an isostatic compression technique.

The open upper end of said tube 8 has a small thickening in the form of a circumferential lip or flange 9 over a length l of its outer wall, so that the diameter of such an end is slightly larger than the diameter of the opening 7. Further, the ratio between the length l and the whole length of the tubular part lies between about 0.1% and 5%.

Further, a solid part in the form of a plug 10 made, for example, of alpha alumina, includes firstly a body 11 whose length is substantially equal to l and secondly, a shoulder 12 whose diameter is substantially equal to the diameter of the open end of the tube 8.

Therefore, it is seen that the tube 8 to be sintered is inserted in the opening 7 and is held by the extra thickness 9 which rests against the edge of said opening 7. The tube 8 is therefore suspended inside the chamber 1. Its lower end is not in contact with the base 3 of the chamber. It is also seen that the shoulder 12 of the part 10 bears against the open end of the tube 8, the body 11 of the part 10 being inserted in the tube.

Consequently, during sintering, the tube 8 contracts except for its open end of length l, which cannot contract due to the fact the part 10 is installed therein.

When sintering is finished, the tubes are removed from the chamber 1 and the upper end of each tube of length l is cut off.

Parts sintered in accordance with this method have very regular dimensions as to both length and diameter; they are therefore perfectly rectilinear and are not at all out of round. Consequently, the subsequent machining operation is easy and rapid and may even not be necessary in the case where the rough parts have dimensions which are predetermined to compensate for contraction due to sintering.

Further, this method is simple, reliable and rapid since loading the sintering chamber does not take very long.

A concrete example is given hereinafter to illustrate the method.

The rough tubes 8 are 500 mm long. Their inner diameter is 29.2 mm and their outer diameter is 33.8 mm.

The extra thickness provided on their open ends has a diameter of 36.4 mm along a length of l of 9 mm.

The body 11 of the part 10 has a diameter of 29 mm. The openings 7 of the plate 6 have a diameter of 34.5 mm.

After sintering, the tubes obtained have a length of 400 mm, an inner diameter of 24.7 mm and an outer diameter of 28 mm.

The invention is advantageously implemented to manufacture solid beta sodium alumina electrolyte tubes for sodium-sulphur electric cells, although it is quite evident that the method can be applied to any sinterable ceramic compound without going beyond the scope of the invention as claimed.

We claim:

1. A method of making a tubular part of sintered ceramic, the method including forming a tubular part of ceramic material, said tubular part having one open end, placing the part in a sintering chamber, and bringing the chamber up to sintering temperature, wherein the improvement comprises:

during said forming step, imparting an extra thickness to the outer wall of the tubular part for a predetermined length adjacent to the said open end;

inserting a plug into said open end of the tubular part, said plug having a body of predetermined length slidably fitting within, and a shoulder bearing against, said open end of the tubular part; and suspending the tubular part substantially vertically within the chamber from a support encircling at least part of the circumference of the tubular member such that the thickened outer wall rests on the support and the other end of the tubular member does not touch the bottom of the chamber, prior to bringing the chamber to sintering temperature, whereby the tubular part is free to shrink during the sintering process wthout distortion.

2. A method according to claim 1, wherein the ratio between the predetermined length of said extra thickness of the outer wall of the tubular part and the entire length of the part is between 0.1% and 5%.

3. A method according to claim 1, wherein the predetermined length of the body of said plug is approximately equal to the predetermined length of said extra thickness of the outer wall of the tubular part.

4. A method according to claim 1, wherein said extra thickness of the outer wall of the tubular part is in the form of a circumferential lip at said open end of said part.

5. A method according to claim 1, wherein said support comprises a horizontal plate having at least one hole therethrough, the diameter of the hole being smaller than the maximum cross dimension of the extra thickness of the outer wall of the tubular part, said tubular part being inserted through said hole.

6. A method according to claim 1, wherein said tubular part, said plug, and said support have substantially the same ceramic composition.

7. A method according to claim 6, wherein said tubular part and said support are made of alkaline beta alumina, and said plug is made of alkaline alpha alumina.

8. A tubular part made of sintered ceramic material, said part having an open end formed with an extra thickness of the outer wall adjacent thereto, wherein, after being formed, said part was sintered at a high temperature while being vertically suspended from an encircling support against which said extra thickness of the outer wall rested, with a plug being inserted into the open end of the tubular part to prevent collapse of the open end during the sintering process, whereby the shape of said tubular part was not deformed during the sintering thereof.

* * * * *